Figure 5:
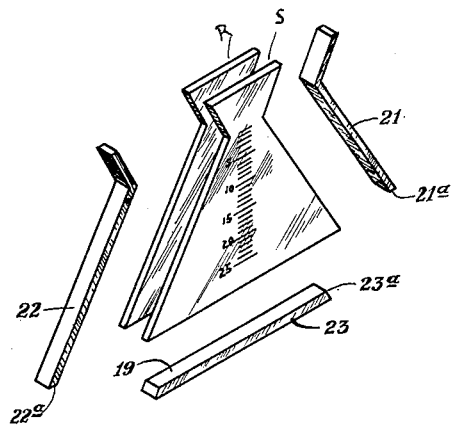

Nov. 21, 1961   P. M. NEUDA   3,009,352
DEVICE FOR TESTING THE ERYTHROCYTE SEDIMENTATION RATE OF BLOOD
Filed Sept. 14, 1959

INVENTOR:
PAUL M. NEUDA, M.D.
BY George B. Auyerott
atty.

United States Patent Office 3,009,352
Patented Nov. 21, 1961

3,009,352
DEVICE FOR TESTING THE ERYTHROCYTE
SEDIMENTATION RATE OF BLOOD
Paul M. Neuda, 68 E. 90th St., New York, N.Y.
Filed Sept. 14, 1959, Ser. No. 839,755
6 Claims. (Cl. 73—61)

The present invention relates to the determination of the erythrocyte sedimentation rate of human blood, and more particularly to standard means of making such determination.

Erythrocytes are what laymen call red-blood corpuscle cells, and, the erythrocyte sedimentation rate, hereinafter called the ESR, relates generally to a method of testing blood by the separation of the blood into its two main constitutents, namely plasma, and erythrocytes. In one of my earlier patents, U.S. Patent No. 2,528,704, I have described a method of testing the ESR of blood with a special type of container, which container is now sometimes referred to in medical circles as Neuda's triangle. The ESR test is a blood test widely used by physicians throughout the world, and done many tens of thousands of times daily in the United States. Until the invention of Neuda's triangle, this test was commonly performed as follows: blood freshly drawn from the cubital vein of a patient is made incoagulable and is transferred into a cylindrical tube, which tube is placed in an erect position and allowed to stand undisturbed. Soon, the erythrocytes begin to settle down. Then, a straight red surface level separates clearly from the remaining yellow plasma and starts sinking. After one hour, a certain distance is reached which is measured in millimeters and is called the ESR of this blood. The ESR is different in different bloods. Since this is a normal phenomenon, there are normal values. But, there are also abnormal values in both directions. If the ESR is abnormally fast, it is called an increased ESR. To a physician, abnormal rates are of valuable clinical significance. An increased rate is of paramount interest. In general, it indicates an inflammatory state or tumerous condition somewhere in the body. The ESR is one of the tests which can indicate the absence or presence of certain latent diseases, and this test is used as a diagnostic means for such diseases as coronary thrombosis, tuberculosis, rheumatic fever, malignancy of tumors (cancer), anaemia, the pelvic inflammatory disease of women, pregnancy, etc.

Common apparently to all these conditions is a breakdown of body tissues. Although the origin of this test is uncertain, and the reasons why it is positive in so many conditions is unknown, the interest in this test is fully justified from the medical standpoint. If the underlying condition recovers and turns to normal, the test will turn to normal. But, regarding the underlying serological factors, and the true meaning of this test, which shows only a deviation in degree from normal, there is still a lack of knowledge. Nevertheless, this does not inhibit its frequent use for diagnostic purposes and clinical follow-ups. As pointed out in my previous patent, U.S. Patent No. 2,528,704, one of the principal, so far unknown factors which greatly influence and effect the ESR, was the shape of the container. In said patent, there was disclosed a method of greatly improving the test results by using a triangularly shaped container. This invention was based on the fact verified by extensive experimentation that the triangular principle used in a container was far superior to the cylindrical principle used in a container.

Since the proper evaluation of the test means the saving or the loss of lives, great care and accuracy is required in the carrying out of the test. To ascertain the results, precise readings and in the shortest possible time are required. The shortest possible time is therefore required because in a reading after one hour as is generally done today in the test with the cylindrical tubes, other forces like agglutinating antibodies may join in with, and falsify by that, the sedimentation phenomenon. These requirements are fulfilled by Neuda's triangle. Since the triangularly-shaped container with the old straight neck is difficult to clean, it is often necessary to discard the container after only one use. Also, guess work must be eliminated in the interpolations of the results of the test, that is to say, the reading of the result must be accomplished readily without having to resort to complicated mathematical calculations.

Although many attempts were made to solve the foregoing difficulties and other difficulties, none, as far as I am aware were successful when carried out into actual practice.

It has now been discovered that a greatly improved, readily cleanable, easily readable test container can be provided where the results are readily readable, easily interpreted, and where the container can be readily cleaned after each test. Besides the cleaning, emphasis is also laid on the prompt and faultless filling of the container with blood. This was not easily achieved in the previous triangular container with the straight neck. A capillary tube introduced into the triangle with the straight neck would not reach the corners at the base of the triangle or the sidewalls to eliminate by rinsing airbubble formation. In the new triangular container with the new neck this is easily achieved.

It is an object of the present invention to provide an improved container for use in the ESR test.

Another object of the present invention is to provide a container for the ESR test wherein the results obtained are quickly and readily ascertained, i.e., in much less time than the usual one hour.

A further object of the present invention is to provide a container for the ESR test which can be readily and easily cleaned thoroughly after each test.

Figure 4:
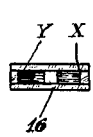
Figure 3:
Figure 1:
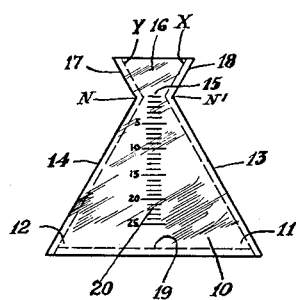
Figure 2:
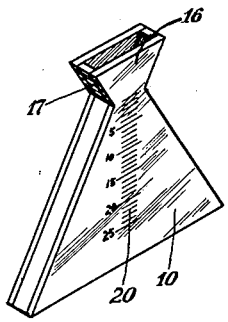

Other objects and advantages will become apparent from the following description taken in conjunction with the accompanying drawing in which:

FIG. 1 is a side view of the device herein contemplated.
FIG. 2 is a side perspective view of the device shown in FIG. 1.
FIG. 3 shows a side view of the top portion of the device illustrated in FIGS. 1 and 2, showing greater details of construction.
FIG. 4 is a top view of the portion of the device depicted in FIG. 3.
FIG. 5 illustrates the construction and assembling of the device.

Broadly stated, the present invention contemplates a triangularly shaped flat container, the sides of the triangle being equiangular, with a top aperture; a V-shaped neck outside said triangle, with each side of the V being exactly parallel to the side of the triangle opposite thereof; and, a precise scale, on the outside of the triangular container calibrated in desired units.

Referring now to the drawings for the details of construction, the device 10 is in the form of an equiangular triangle, wherein the two base angles 11 and 12 are both 60°. The sides 13 and 14 of this triangle are equal of course. At the top of this triangle, i.e., at the apex, there is an opening 15, and on the outside of this triangle there is provided a V-shaped neck 16 having two equal sides 17 and 18. The critical feature of this neck is that the sides of the neck are parallel to the opposite sides of the container triangle. Thus, side 17 is parallel to side 13 and side 18 is parallel to side 14, i.e., sides 13 and 17 are both at an angle of 60° clockwise with respect to the base 19 of the triangle and sides 14 and 18 are both at an angle of 60° counterclockwise to base 19. This container is constructed in the following manner. Sheets R and S of plastic material, treated with a water repellent substance, e.g., a silicone substance are precut to the shape depicted in FIG. 5 of the drawing. On at least one of the sheets, e.g., sheet R there is provided a very accurate scale 20 beginning at the small of the neck, i.e., that portion at which the aperture will be located, and graduated down to 25 mm., but also indicating the 30 mm. line so that side walls 21 and 22, as well as bottom 23 can be set so that the bottom can be placed exactly 5 mm. below the 25 mm. mark, i.e., leaving exactly 5 mm. between the last graduation and the inner bottom of the container so that when the container is formed it will be exactly 30 mm. high, on the inside. The inner distance across the width of the neck, distance N—N' is such that when the walls 21 and 22 are inserted, the opening 15 will be exactly 3 mm. wide. Thus, the exact height of the inner triangle of the container will be exactly 30 mm. and the exact width of the top opening at the apex of the triangle will be exactly 3 mm. regardless of the thickness of the material since we are primarily concerned with the inner dimensions. In the upper portion of the container, the neck sidelines 17 and 18 leave the horizontal at an angle of 120° and are exactly 9 mm. long. Thus, the inner width of the top of the container, i.e., the distance between X and Y is exactly 12 mm. It is of course readily understood that geometrically speaking, the inner dimensions of both the neck triangle and the lower triangle are in the ratio of two, one and the square root of three, i.e., the height of an equiangular triangle is equal to one half one of the sides multiplied by the square root of three.

Left and right walls 21 and 22 as well as bottom 23 are advantageously precut. Left and right walls 21 and 22 are V-shaped with one long and one short arm, and sized to engage the sides of the container as illustrated in FIG. 5. The angle of the V of the two arms is 120°. The lower ends of the walls 21a and 22a as well as both ends 23a of the bottom 23 are tapered so that these elements will dove tail into each other as depicted in FIG. 5. The thickness of the walls must be such that when assembled, the inner distance between R and S will be exactly 3 mm. Thus, the opening 15 in the neck will be exactly 3 mm. square. The fastening of the sheets to the walls and bottom is well known in the art and requires no detailed explanation. However, care should be exercised so that no bumps or rough spots appear on the inside of the container, either during the assembling, or during subsequent washings.

For the purpose of giving those skilled in the art a better understanding of the invention and a better appreciation of the advantages of the invention, the following illustrative examples are given, and, it is anticipated that the scientific value of this invention is seen as the availability of a principle of testing and a device which corresponds strictly to this principle, enabling the investigator to determine the ESR:

(a) in an optimal and standard fashion
(b) in an optimal and standard time (five to ten minutes as compared to the usual one hour)

In the following examples of comparative ESR determination, of a rapidly settling blood after 5 minutes of settling, there is used both a Wintrobe cylindrical tube, 100 mm. high, 3 mm. in diameter, and, the triangularly shaped container shown in the drawing with an inner height of 30 mm.

*Example I*

The blood was of a case of Hodgkins disease, tumors of the lymph glands. Settling after 5 minutes.
In the Wintrobe tube—3.5 mm.
In Neuda's triangular container—22 mm.

*Example II*

The blood was of a case of bleeding gastric ulcer. Reading after 5 minutes,
In the Wintrobe tube—1 mm.
In Neuda's triangular container—9 mm.

*Example III*

The blood was of a case of cirrhosis of the liver. Reading after 5 minutes,
In the Wintrobe tube—0.5 mm.
In Neuda's triangular container—7 mm.

The superiority of the triangular method over the cylindrical method, both in time and in efficiency is, scientifically speaking, not the result of the container, but, the result of the settling blood volume forced into the triangular shape. The settling force is the plasma here and there. But, it can exert its full force only if, for the necessary opposite movements, i.e., the plasma up, the erythrocytes down, the whole blood volume is in a triangular shape. Since this shape has to be maintained by a container, the design of the container cannot be separated from the method of testing; they are one and indivisible. Furthermore, for the carrying out of the invention into practice, the container must have a neck, and the neck herein described will give the optimum results.

From the foregoing examples, it is now readily seen why scale 20 is graduated down to 25 mm. By the use of the present test container the test is completed in a few minutes and read directly in the desired units. Furthermore, this shaping of the neck allows easy and thorough cleaning and filling with blood as well of the entire container after and before the ESR test. Heretofore, this kind of complete cleaning and filling was not possible because of the straight neck design. This improvement is of great significance for the purpose and use of this container since until now, after each test, the problem presented before the next ESR test was whether or not to discard the container after a one time use. This constituted a real problem regarding both efficiency and economy. This problem can be considered solved by the neck of the container hereinbefore described.

The present invention is particularly applicable to large institutions such as hospitals performing hundreds of tests daily where a great saving can be now accomplished in the use of these containers. Also, the scale herein described gives an immediate reading of the results of the tests and no mathematical computations are necessary.

It is to be observed that the present invention provides for a device for use in the ESR test, which device comprises in combination, two flat transparent sheets R and S; each of said sheets being precut to form a container portion and a neck portion 16, said container portion being in the form of an equiangular triangle, an aperture being provided at the apex of said triangle, said neck portion 16 being likewise triangular in shape, each side of the neck being parallel to the side of the container portion opposite thereto; the distance from the base of the container portion to the apex aperture being exactly 30 mm., inner dimension; a precisely graduated scale on one of said sheets, e.g., sheet S, down the vertical center of said container portion with the 0 mark at said aperture, the 25 mm. mark being 5 mm. above the base of the triangle; the sides of the neck being about 9 mm. in length; the aperture between the neck and the apex of the container being about 3 mm. wide; a pair of V-shaped sides, i.e., side walls 21 and 22, adapted to engage the sides of said sheets, the thickness of said walls being such that the inner transverse dimension of the container will be about 3 mm., and, a bottom 23, adapted to act as the base of the triangular container portion, said walls being tapered at the lower ends thereof and said bottom being tapered at the sides thereof so as to dove tail into said tapered ends of said walls.

I claim:

1. A test container for use in the erythrocyte sedimentation rate test, comprising in combination, front and rear water repellant, flat transparent sheets, each sheet being shaped like two truncated triangles, one large and one small, the large triangle being adapted to form a container portion, the small triangle, a neck portion, the truncated apex of said two triangles forming the small of the neck, the base angles of said triangles being all sixty degrees, the height of the large triangle from the base to said neck being slightly over thirty millimeters high, the sides of the small triangle forming the neck being about nine millimeters long; a scale on said front sheet graduated downwards in millimeters from 0 millimeters at said neck; a thin bottom as the base between said sheets; and, two V-shaped walls, each with one short and one long arm to the V, and of the same width as said bottom, said walls forming the side walls of said container and neck and coinciding with the sides of said triangles.

2. A test container for use in the erythrocyte sedimentation rate test, comprising in combination, front and rear water repellant flat transparent sheets, each sheet being shaped like two truncated triangles, one large and one small, the large triangle being adapted to form a container portion, the small triangle, a neck portion, the truncated apex of said two triangles forming the small of the neck, the base angles of said triangles being all sixty degrees, the height of the large triangle from the base to said neck being slightly more than thirty millimeters high, the sides of the small triangle forming the neck being about nine millimeters long; a scale on said front sheet graduated downwards in millimeters from 0 millimeters at the neck; a thin bottom set at the base between said sheets so disposed that the height from said bottom to said truncated apex is thirty millimeters; and, two V-shaped walls, each with one short and one long arm to the V, and of the same width as said bottom, said walls forming the side walls of said container and neck and coinciding with the sides of said triangles.

3. A device as claimed in claim 2, the width of said bottom and side walls being such that the inner distance along said bottom and walls between said front and rear sheets is three millimeters.

4. A device as claimed in claim 3, said scale being graduated downwards in millimeters from 0 millimeters at said neck to 25 millimeters towards the base.

5. A device as claimed in claim 4, wherein the opening at the small of the neck between said two triangles is 3 millimeters square.

6. A device as claimed in claim 5, said bottom being set so that the distance from said bottom to said neck inside said container is exactly 30 millimeters.

References Cited in the file of this patent

UNITED STATES PATENTS 2,528,704     Neuda _____ Nov. 7, 1950